Oct. 9, 1928.
E. A. JOHNSON
1,687,296
SYSTEM OF COUNTERBALANCES FOR MOTOR CARS
Filed Aug. 27, 1927
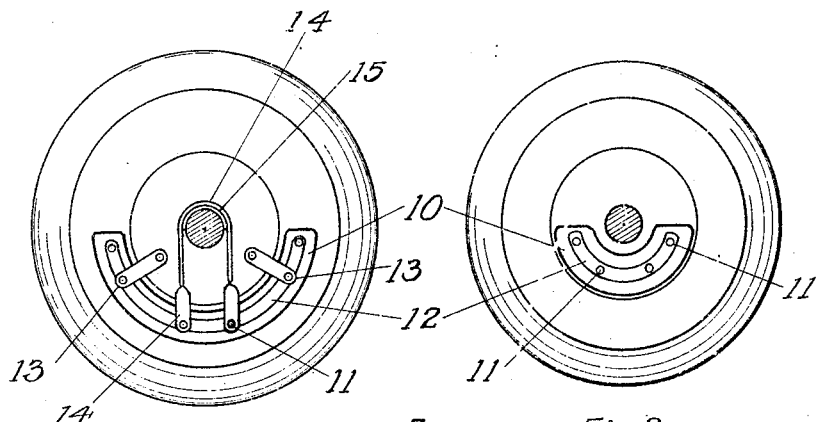
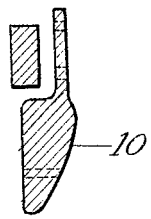
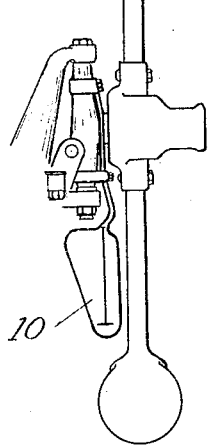
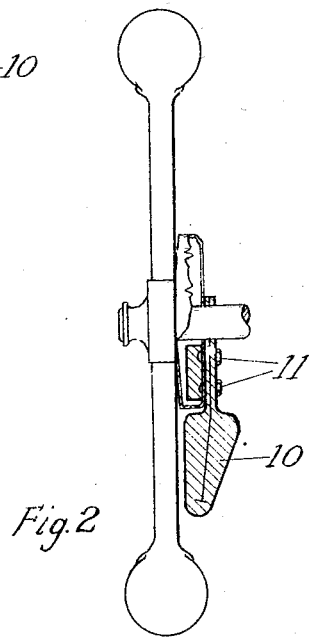
Einar A. Johnson INVENTOR.
BY Peter M. Boesen
ATTORNEYS.

Patented Oct. 9, 1928.

1,687,296

UNITED STATES PATENT OFFICE.

EINAR ARTHUR JOHNSON, OF BROOKLYN, NEW YORK.

SYSTEM OF COUNTERBALANCES FOR MOTOR CARS.

Application filed August 27, 1927. Serial No. 215,770.

This invention relates to a scientific safety-system for automobiles and has for its object upon the basis of tested principles to lower the center of gravitation in a motor car, as I provide the latter with a system of counterbalances, or contraweights, in form of a plurality of well shaped members, which may be applied to the chassis of a car in such a manner that the latter, whether of a heavy, or light construction will not tip, or turn over, when driven at high speed, but will also, without reducing said speed to a considerable degree, be able to take any curve of a road safely.

In like manner experience has taught, that a car equipped with a device of the kind, as will be hereinafter more fully described, may be brought to a stop quicker and more effectively, and with no danger of skidding, on account of such special weights arranged in close proximity to the rear wheels, and below the axle.

It might be well in this connection to call the attention to the fact, although self-evident, that a car with my device attached may be taken over any road, without regard to its condition, safely and with comfort to its passengers; minimizing at the same time the difficulties, usually present in steering a car under such conditions, and thereby preventing a zigzag course, and the incidental danger of collision.

Furthermore it is to be noted, that even a small car will with my device applied be under complete control at any speed.

A further advantage of said device, incidental to the use of same, would be that cars hereafter may be built much lighter of weight, without in any way impairing their steadiness of run, or facility of operation.

A still further advantage of very great importance lies in the equipment, and use, of this device in connection with racing cars. Hitherto the said cars have had their main balance residing in the chassis, while with this device applied, the aforesaid cars may be built very light, and by placing the balancing weight in the right position, as herein provided, may be able to add considerably to their speed.

As the said device is of a simple construction and made preferably substantially of lead, it may be manufactured at a very small cost, and should be very durable.

With the above and other objects in view, this invention consists of the novel features of construction, combination and arrangements of parts, hereinafter fully described claimed, and illustrated in the accompanying drawings forming parts of this specification, and in which similar characters of reference indicate corresponding parts in all views, and in which:

Figure 1 is a side elevation of my device applied to an automobile-wheel; Fig. 2 is an edge-view of same, partly in section; Fig. 3 is another side elevation showing my device attached; while Figs. 4 and 5 are detail views in modified forms, illustrating my device.

Referring more particularly to the drawings, I desire to point out, that the illustrations, herein shown, are of a more general character, in order to emphasize my basic principles, as these may be embodied, while naturally, the device, as disclosed, may be subject to a great variety of changes, in forms, etc., well within the spirit of this idea, and the said principles covering the same. Thus 10 illustrates a weight-member, preferably of lead, which may be of a form substantially similar to those disclosed in Figs. 4 and 5. The said weight-member, of which there are four, is applied in close proximity to all the wheels of a car, but in certain proportions, that is, I prefer to attach the more heavy weights at the rear wheels.

As the said weights are suspended below the axle of a car, they may be attached in any suitable manner, for instance, to the sections carrying and controlling the wheels, however, without any connections with the latter; naturally the said weight-member would be attached, as the case may be, to the housing or the brake-drum-section, as clearly shown in Fig. 3. In order to attach the said weight-member I employ bolts or screws 11, and I prefer to make the said weight-member with reinforced sections 12 in order to secure a solid unit with the attaching medium, when mounted thereupon; I may further provide said weight-member with lugs 13, for the sake of attachment as shown in Fig. 1, to assure a still more compact fitting of the latter.

In this connection I may also, in addition, employ a semi-circular ring 14, attached to said weight in order to carry the latter; a piece of suitable lining 15 being inserted between said ring and its supporting member to avoid any wear by friction.

As to the aforesaid reinforced sections 12, formed upon the weight-members, I may omit those, and instead use supporting brackets, the provision of the latter being to connect the supporting medium, for instance, the brake drum, with the weight-member in an integral manner.

An essential feature of my device is, that it will form an integral part with its support to the effect of maintaining at all times a right angle with the latter.

It is obvious that changes may be made in the form, construction and arrangement of the several parts, as shown, within the scope of the appended claim, without departing from the spirit of the invention, and I do not therefore limit myself to the construction and arrangement shown and described herein.

What I claim as new, and desire to secure by Letters Patent of the United States, is:

In a safety-device for automobiles, having for its purpose to lower the center of gravitation as described, a plurality of counterbalancing members suspended below the axles of a car, bands for supporting said weights, a member therebetween to eliminate friction, and a plurality of bracket-members attached by means of bolts to a stationary section of the chassis and to said weights for securing the latter in a rigid position, substantially as and for the purpose set forth.

Signed at New York city, in the county of New York and State of New York, this 10th day of August A. D. 1927.

EINAR ARTHUR JOHNSON